(12) United States Patent
Carney

(10) Patent No.: US 11,140,072 B2
(45) Date of Patent: *Oct. 5, 2021

(54) TRANSPARENT SATELLITE ROUTING SYSTEM AND METHOD

(71) Applicant: MASTERCARD INTERNATIONAL INCORPORATED, Purchase, NY (US)

(72) Inventor: Kevin S. Carney, St. Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/579,589

(22) Filed: Sep. 23, 2019

(65) Prior Publication Data

US 2020/0021517 A1    Jan. 16, 2020

Related U.S. Application Data

(63) Continuation of application No. 15/839,219, filed on Dec. 12, 2017, now Pat. No. 10,454,816.

(51) Int. Cl.
| | | |
|---|---|---|
| *H04L 12/725* | (2013.01) | |
| *H04B 7/185* | (2006.01) | |
| *H04L 12/781* | (2013.01) | |

(52) U.S. Cl.
CPC ....... *H04L 45/306* (2013.01); *H04B 7/18515* (2013.01); *H04B 7/18517* (2013.01); *H04B 7/18519* (2013.01); *H04L 45/52* (2013.01)

(58) Field of Classification Search
CPC ... H04L 45/306; H04L 45/52; H04B 7/18515; H04B 7/18517; H04B 7/18519
See application file for complete search history.

(56) References Cited

U.S. PATENT DOCUMENTS

| | | |
|---|---|---|
| 8,780,928 B2 | 7/2014 | Natarajan et al. |
| 8,918,047 B1 | 12/2014 | Teller et al. |

(Continued)

FOREIGN PATENT DOCUMENTS

WO   2012037666 A1   3/2012

OTHER PUBLICATIONS

PCT International Search Report and Written Opinion, Application No. PCTIUS2018/059322, dated Mar. 11, 2019, 12 pps.

*Primary Examiner* — Dady Chery
(74) *Attorney, Agent, or Firm* — Armstrong Teasdale LLP

(57) ABSTRACT

In one aspect, a SR computing device is provided, including a first network interface connected to a dynamically routed transport network, and a second network interface connected to a statically routed transport network. The SR computing device receives a first network data packet including a first destination address and a first data payload over the first network interface, and retrieves transport network routing information from a routing table stored by the SR computing device, based on the first destination address. The SR computing device generates a first transport packet for the first network data packet, where the transport network routing information includes instructions for the first transport packet to be routed over at least one satellite link, and transmits the first transport packet to the transport network over the second network interface, based on the transport network routing information.

18 Claims, 7 Drawing Sheets

(56) References Cited

U.S. PATENT DOCUMENTS

| | | |
|---|---|---|
| 9,374,152 B2 | 6/2016 | Collins et al. |
| 2002/0164030 A1 | 11/2002 | Stephenson et al. |
| 2008/0025249 A1* | 1/2008 | Kuppuswamy .... H04B 7/18567 370/325 |
| 2012/0218936 A1 | 8/2012 | Fleeman et al. |
| 2015/0381264 A1 | 12/2015 | Collins et al. |
| 2016/0105234 A1 | 4/2016 | Anders et al. |
| 2016/0204853 A1 | 7/2016 | Anders et al. |
| 2016/0315691 A1 | 10/2016 | Ahluwalia et al. |
| 2017/0230105 A1 | 8/2017 | Baudoin et al. |

\* cited by examiner

TRANSPARENT SATELLITE ROUTING SYSTEM AND METHOD

This application is a continuation application of U.S. patent application Ser. No. 15/839,219, filed Dec. 12, 2017, entitled "TRANSPARENT SATELLITE ROUTING SYSTEM AND METHOD", the disclosure of which is hereby incorporated by reference in its entirety.

BACKGROUND

The field of the present disclosure relates generally to satellite routing of data, and more specifically, to routing data packets between network segments using a satellite link.

Modern computer networks, associated with data production, depend on adaptable and intelligent network routing, including providing links between computing devices that are established dynamically, without extensive configuration. Additionally, modern expectations of networks include the ability to easily extend the network with additional network devices and accommodate increasing usage.

Satellite based communication systems are associated with complex configuration, expensive hardware, and inflexible network routing. Additionally, at least some known satellite communication resources are underused due to architectural incompatibility with modern communication methods. However, satellite based communication systems may be necessary in certain scenarios, where computing devices are geographically disparate. Additionally, some satellite communication systems may have available bandwidth desired by modern applications, but those systems may be limited by implementation challenges.

Manually configuring individual applications and/or devices for satellite routing can be time consuming, complex, and error-prone, becoming impractical given the current pace of software application development.

BRIEF DESCRIPTION

In one aspect, a SR computing device is provided, including a first network interface connected to a dynamically routed transport network, and a second network interface connected to a statically routed transport network. The SR computing device receives a first network data packet including a first destination address and a first data payload over the first network interface, and retrieves transport network routing information from a routing table stored by the SR computing device, based on the first destination address. The SR computing device generates a first transport packet for the first network data packet, where the transport network routing information includes instructions for the first transport packet to be routed over at least one satellite link, and transmits the first transport packet to the transport network over the second network interface, based on the transport network routing information.

In another aspect, a computer-implemented method for satellite data routing is provided. The method includes receiving a first network data packet including a first destination address and a first data payload over a first network interface associated with a dynamically routed network, and retrieving transport network routing information from a routing table based on the first destination address. The method further includes generating a first transport packet for the first network data packet including instructions for the first transport packet to be routed over at least one satellite link, and transmitting the first transport packet through a second network interface associated with a statically routed network, based on the transport network routing information.

In yet another aspect, a computer-readable storage media for satellite data routing is provided. When executed by a processor in communication with a memory, the computer-executable instructions cause the processor to receive a first network data packet including a first destination address and a first data payload over the first network interface, and retrieve transport network routing information from a routing table stored by the SR computing device, based on the first destination address. The computer-readable instructions further cause the processor to generate a first transport packet for the first network data packet, where the transport network routing information includes instructions for the first transport packet to be routed over at least one satellite link, and transmit the first transport packet to the transport network over the second network interface, based on the transport network routing information.

BRIEF DESCRIPTION OF THE DRAWINGS

FIG. 1 is a block diagram of an example computer system including the satellite routing (SR) computing device used for routing network packets across a satellite link.

FIG. 2 is a device level message flowchart illustrating an example implementation of the system shown in FIG. 1.

FIG. 3 is a network level message flowchart illustrating an example implementation of the example computer system shown in FIG. 1.

FIG. 4 illustrates an example configuration of a user computer device that may be used with the computer system shown in FIG. 1.

FIG. 5 illustrates an example configuration of a server computer device that may be used with the computer system shown in FIG. 1.

FIG. 6 is a flowchart illustrating an example process of the computer system of FIG. 1.

FIG. 7 is a diagram of components of one or more example computing devices that may be used in the computer system of FIG. 1.

DETAILED DESCRIPTION

Figure 1:
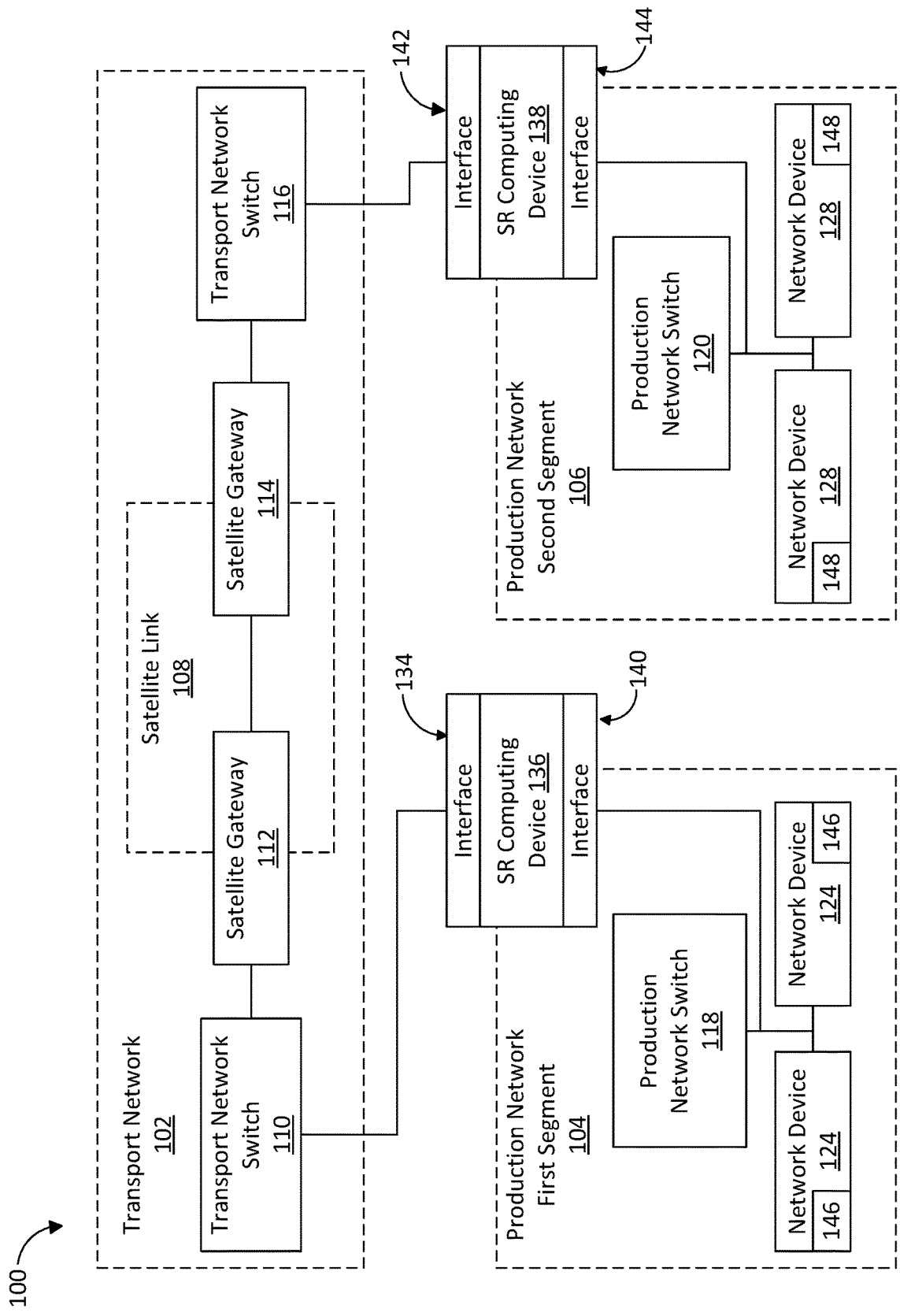
FIGS. 1-7 show example embodiments of the methods and system described herein.

The systems and methods described in this disclosure are directed to creating a tunnel connection between network segments, and more specifically, to routing data packets between network segments using the tunnel connection which includes a satellite link. In one embodiment, the tunnel connection is transparent, such that the tunnel connection is not apparent to either the two production networks connected by the tunnel. For example, interfaces on the production networks may be directly addressed, regardless of whether the tunnel connection is used to route the communication between the networks.

In the example embodiment, the network segments include a first production network and a second production network connected by a tunnel connection (e.g., transport network), where both production networks include any number of network devices (e.g., user computing devices, mobile devices, network switches) having a network interface (e.g., Ethernet connection, fiber connection, Wi-Fi connection, satellite connection). The tunnel connection includes a satellite link, where the satellite link refers to a network component that includes a satellite and two ground stations, and provides data communication between the geographically disparate ground stations. The tunnel connection manages transporting data packets between the two network segments, and helps to join the physically disparate network segments into a single logical network. In certain embodiments, the tunnel connection may facilitated by a transport network, such as a Multiprotocol Label Switching (MPLS) network.

Data packet refers to an instance of data transmitted over a network, such as the production network or the transport network (e.g., tunnel connection), including a data payload and routing information. Data packets are received and transmitted by network devices using a network interface. Initially, data packets are generated and transmitted to a network (e.g., the first production network segment) by a user computing device, and may subsequently be received and retransmitted by switching devices to route the data packet over the physical network, before being received by a user computing device associated with a destination address included in the data packet.

In the example embodiment, a satellite routing (SR) computing device receives a network packet over a first network interface from a production network, retrieves routing information, generates a transport packet including transport network routing information, and transmits the transport packet over a second network interface to a transport network. In some embodiments, the transport network routing information includes instructions to route the transport network packet using a satellite link. In one aspect, the SR computing device is an enhanced switching device.

The production network includes switching and computing devices and is at least partially dynamically routed. In some embodiments, the production network is routed using switching devices based on addresses (e.g., IP addresses) associated with network interfaces of computing devices. In one embodiment, each network interface attached to the production network is assigned a unique address, and data transmitted over the network includes a destination address, such that the switching devices dynamically route a path across the network to the network interface (e.g., destination computing device) associated with the designation address. In another embodiment, the network is routed using Border Gateway Protocol (BGP). For example, a computing device may transmit a network packet including a destination IP address to the production network using a network interface associated with the production network. The network packet may be routed to a destination network interface (e.g., destination computing device) associated with the destination IP address using a switching device. Network packets may include a destination address (e.g., IP address) and a data payload. In some embodiments, the production network enhances or improves communication between network devices by dynamically selecting routes between any pair of network interfaces. For example, a production network computing device may address network packets for any other production network computing device without knowledge of the production network architecture. In certain aspects, the production network may require additional processing of network packets by the switching devices, leading to additional equipment needs and/or additional processing time.

In certain embodiments, computing devices are associated with a plurality of network interfaces and network addresses. In some embodiments, computing devices may have virtual network interfaces, such that the network interface is defined by software executed by the computing device. For example, virtual network interfaces may be used to provide multiple network interfaces using a single physical network interface. In another example, multiple interfaces may utilize different bands of a single physical interface, such as a coaxial connection. In other embodiments, network interfaces include physical interfaces, such as Ethernet or fiber connections.

The transport network includes switching and computing devices, and is at least partially statically routed. In some embodiments, the production network is routed using switching devices based on a path label (e.g., MPLS label) associated with a series of routing devices (i.e., static route) and an endpoint. In one embodiment, the transport network is routed using Multiprotocol Label Switching (MPLS). For example, a computing device may transmit a transport packet that including a path label to the transport network using a network interface, and the transport packet may be forwarded along the network route identified in the path label. In other embodiments, the production network is routed based on an identifier included in a transport packet, where the identifier is associated with at least one static route. In one embodiment, transport packets transmitted to the network have a predefined route identified by the path label. In certain embodiments, the production network may require minimal additional processing of the transport packets by the switching devices, which may result in reduced equipment needs and/or reduced processing times.

Transport packet describes a data structure that includes a static route identifier (e.g., MPLS label or path label), a destination address (e.g. an IP address), and a data payload. In some embodiments, a transport packet includes a network packet and a static route identifier. In certain embodiments, the transport packet includes a plurality of static route identifiers associated with a sequence of static routes. For example, a transport packet may include a stack of MPLS labels.

In some embodiments, the transport network includes a satellite link. As used herein, satellite link refers to a system that includes two satellite gateways and at least one satellite computing device. In one aspect, a satellite link provides data communication between computing devices in two disparate geographic locations. In another aspect, a satellite link provides a fixed link between two routing devices (e.g., satellite gateways). In one embodiment, the specialized hardware and geographic restrictions associated with satellite links may pose a challenge to utilizing the link within dynamic networks.

The SR computing device includes at least two network interfaces. In some embodiments, at least one of the network interfaces may be virtual. In some embodiments, a first network interface is associated with a production network routed using IP addresses (e.g., dynamically routed), and a second network interface is associated with a transport network routed using MPLS labels (e.g., statically routed). In certain embodiments, the SR computing device is configured to receive network packets over a first network interface, transmit transport packets over a second network interface, receive transport packets over the second network interface, and transmit network packets over the first network interface.

In some embodiments, the SR computing device is configured to store routing information. Routing information includes MPLS labels, IP addresses, BGP route identifiers, and the like. In one embodiment, the SR computing device is configured to store a routing table that includes routing information. Additionally or alternatively, the SR computing device is configured to retrieve routing information from a database that includes a routing table. In some embodiments, the SR computing device is configured to receive routing information, and store the received routing information in the routing table. In other embodiments, the SR computing device is configured to generate routing information based at least in part on received network packets, and store the generated routing information in the routing table.

The SR computing device is configured to receive network packets, including an IP address and a data payload, using a first network interface connected to a first production network segment, wherein the IP address is associated with the production network. In another embodiment, the IP address is associated with a second production network segment. For example, the SR computing device may receive a network packet from a first production network segment that includes an IP address bound to a network interface on the second production network segment so that the network packet can be transported from the first production network segment to the second production network segment. In certain embodiments, the network packet includes a source identifier, such as a source IP address or a community value ("CV"). For example, a CV value may indicate a transport packet is associated with a geographically isolated data center (e.g., network segment). In another example, a source identifier may include a source IP address associated with a first production network segment computing device.

The SR computing device is configured to retrieve routing information based at least in part on an IP address included in a network packet from a routing table, wherein the routing table includes IP address rules and transport network routing information. As used herein, IP address rules may specify an IP address or a range (e.g., subnet) of IP addresses. In some embodiments, the network routing information includes instructions for routing a transport packet using at least one satellite link. In one embodiment, transport network routing information includes an MPLS label. In one example embodiment, the SR computing device retrieves routing information based on an IP address associated with the second production network segment, and the retrieved routing information includes a transport network path identifier, wherein the transport network path identifier includes instructions for routing the transport packet from the SR computing device second network interface to an interface associated with the second production network segment.

In certain embodiments, the SR computing device is further configured to receive routing information based on a source identifier (e.g., community value). For example, the community value may be associated with a geographically isolated data center, such that the routing data includes instructions to route the network packet over a satellite link associated with the isolated data center. In another embodiment, the source identifier identifies a data center (e.g., production network segment) processing data associated with a network including a plurality of geographically isolated network segments, such that the routing data includes instructions to route network packets originating at the data center over a satellite link to their respective destinations.

The SR computing device is configured to encode network packets as transport packets based at least in part on the retrieved routing information, wherein the transport packet includes a data payload, a production network IP address, and transport network routing information. In one embodiment, the SR computing device prepends a transport network header, including transport network routing information, to a network packet including a production network IP address and a data payload. In some embodiments, network routing information includes instructions for transmitting network packets over a satellite link. In other embodiments, network routing information includes an indicator, wherein the indicator is configured to cause the transport network to route transport packets over a static path associated with a satellite link. For example, the SR computing device may prepend static routing information to a network packet, and the static routing information may include instructions for the transport network to route the transport packet over a satellite link.

In some embodiments, the SR computing device is configured to compress and/or encrypt the data payload included in the transport packet. In one embodiment, the SR computing device compresses a data payload included in a network packet, and includes the compressed data payload in a transport packet. For example, the SR computing device may use HTTP compression associated with compression protocols such as "gzip", or "deflate". In other embodiments, the SR computing device may encrypt a data payload included in the network packet, and include the encrypted data payload in a transport packet. For example, the SR computing device may encrypt a data payload using an encryption key associated with the production network, and transmit the encrypted data payload as a transport packet The SR computing device is configured to transmit transport packets to the transport network using the second network interface, based at least in part on the transport network routing information. In one embodiment, the SR computing device transmits the transport packet, including routing information, to a transport network switching device using an Ethernet connection. In another embodiment, where the second network interface is a virtual interface, the SR computing device transmits the network packet, including routing information, to a transport network switching device using a virtual private network (VPN) connection provided over the first network interface. For example, the SR computing device may include a tunnel connection to transmit transport packets to a transport network switching device.

The SR computing device is configured to receive transport packets from the transport network over the second network interface. In some embodiments, the SR computing device is an endpoint and/or edge point of a MPLS path, and receives transport packets based on static routing. In other embodiments, the SR computing device is configured to receive packets based on an IP address associated with the second network interface. In certain embodiments, the transport network packet is received over a physical network interface, such as an Ethernet connection or fiber connection. In other embodiments, the transport network packet is received over a virtual network interface, such as a VPN adapter and/or tunnel connection adapter.

The SR computing device is configured to decode transport packets as network packets, including an IP address and a data payload. In one embodiment, the SR computing device is configured to remove an MPLS label from a transport packet, creating a network packet including the remaining IP address and data payload. In another embodiment, the SR computing device is configured to retrieve an IP address from the routing table based on the routing information included in the transport packet. In one aspect, the network packet includes an address (e.g., IP address) associated with the production network. In another aspect, the data payload of the network packet is substantially similar to the data payload of the network packet. For example, the transport packet may include a compressed and/or decrypted version of the data payload.

The SR computing device computing device is configured to transmit network packets to the production network over the first network interface, based at least in part on the IP address included in the network packet. In one embodiment, the SR computing device is configured to transmit the network packet using a first network interface to a production network switching device. For example, the SR computing device may transmit the network packet over Ethernet.

The methods and systems described herein may be implemented using computer programming or engineering techniques including computer software, firmware, hardware or any combination or subset thereof, wherein the technical effects may be achieved by performing one of the following steps: (i) receive a first network data packet including a first IP address and a first data payload over the first network interface, wherein the first IP address is associated with a second production network segment; (ii) retrieve routing information from a routing table based at least in part on the IP address included in the received network packet, wherein the routing table includes IP address rules and transport network routing information; (iii) generate a first transport packet for the first network data packet, including the first data payload, the first IP address, and the transport network routing information, wherein the transport network routing information includes instructions for the transport packet to be routed over at least one satellite link; and (iv) transmit the first transport packet to the transport network over the second network interface, based at least in part on the transport network routing.

The systems and methods described herein are configured to facilitate (a) increased utilization of satellite routing resources; (b) automated routing and addressing between production network segments; (c) automated routing and addressing of routes including a satellite link; (d) automatic detection of network packets requiring satellite routing; (e) enhancing dynamic routing systems to include statically routed satellite links; sand (0 reduced configuration required for production network devices.

Described herein are computer systems such as a SR computing device. As described herein, all such computer systems include a processor and a memory.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to creating tunnels and/or connections between network segments using satellite routing.

FIG. 1 is a schematic diagram illustrating an example network system 100, including production network first segment 104, production network second segment 106, and transport network 102. Production network first segment 104 includes network devices 124, where each network device 124 includes an IP address 146 associated with the production network first segment 104. Production network 104 includes a production network switch 118, configured to route network packets based on destination IP addresses. SR computing device 136 includes a network interface 140 connected to production network first segment 104, specifically through production network switch 118.

SR computing device 136 further includes a network interface 134 connected to a transport network 102, specifically through transport network switch 110. Transport network 102 includes satellite link 108. Satellite link 108 is provided by a first satellite gateway 112, connected to transport network switch 110, and a second satellite gateway 114, connected to transport network switch 116. SR computing device 138 includes network interface 142 connected to transport network 102, specifically through transport network switch 116.

SR computing device further 138 further includes network interface 144, connected to production network second segment 106, specifically through production network switch 120. Production network second segment includes production network switch 120, connected to network devices 128, each including network IP address 148, associated with production network second segment 106.

An example network route from SR computing device 136 to SR computing device 138 includes sequentially network interface 134, associated with production network first segment 104 and SR computing device 136, transport network switch 110, associated with transport network 102, satellite gateway 112, satellite gateway 114, transport network switch 116, and network interface 142, associated with SR computing device 138 and production network second segment 106.

Figure 2:
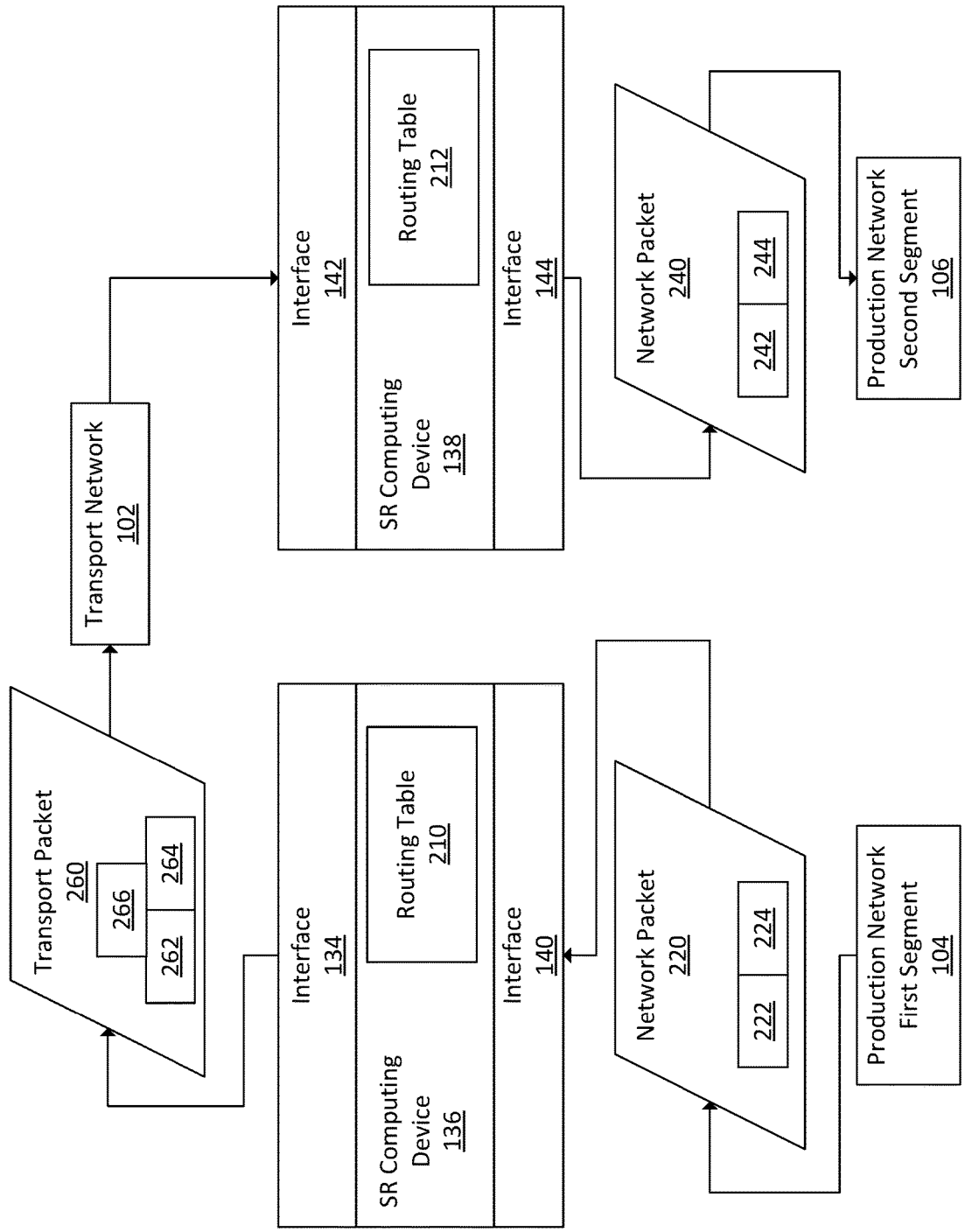

FIG. 2 is a device level data flow diagram of network system 100. SR computing device 136 receives network packet 220 from production network first segment 104 over network interface 140. Network packet 220 includes IP address 222, and data payload 224. SR computing device 136 retrieves network routing information from routing table 210, generates transport packet 260 based at least in part on network packet 220, and transmits transport packet 260 to transport network 102, using network interface 134. Transport packet 260 includes routing information 266, IP address 262, and data payload 264.

SR computing device 138 receives transport packet 260 from transport network 102 using network interface 142. In some embodiments, SR computing device retrieves network routing information from routing table 212, and generates a network packet 240, including IP address 242 and data payload 244, based on transport packet 260. SR computing device 138 transmits network packet 240 to production network second segment 106, using network interface 144.

Figure 3:
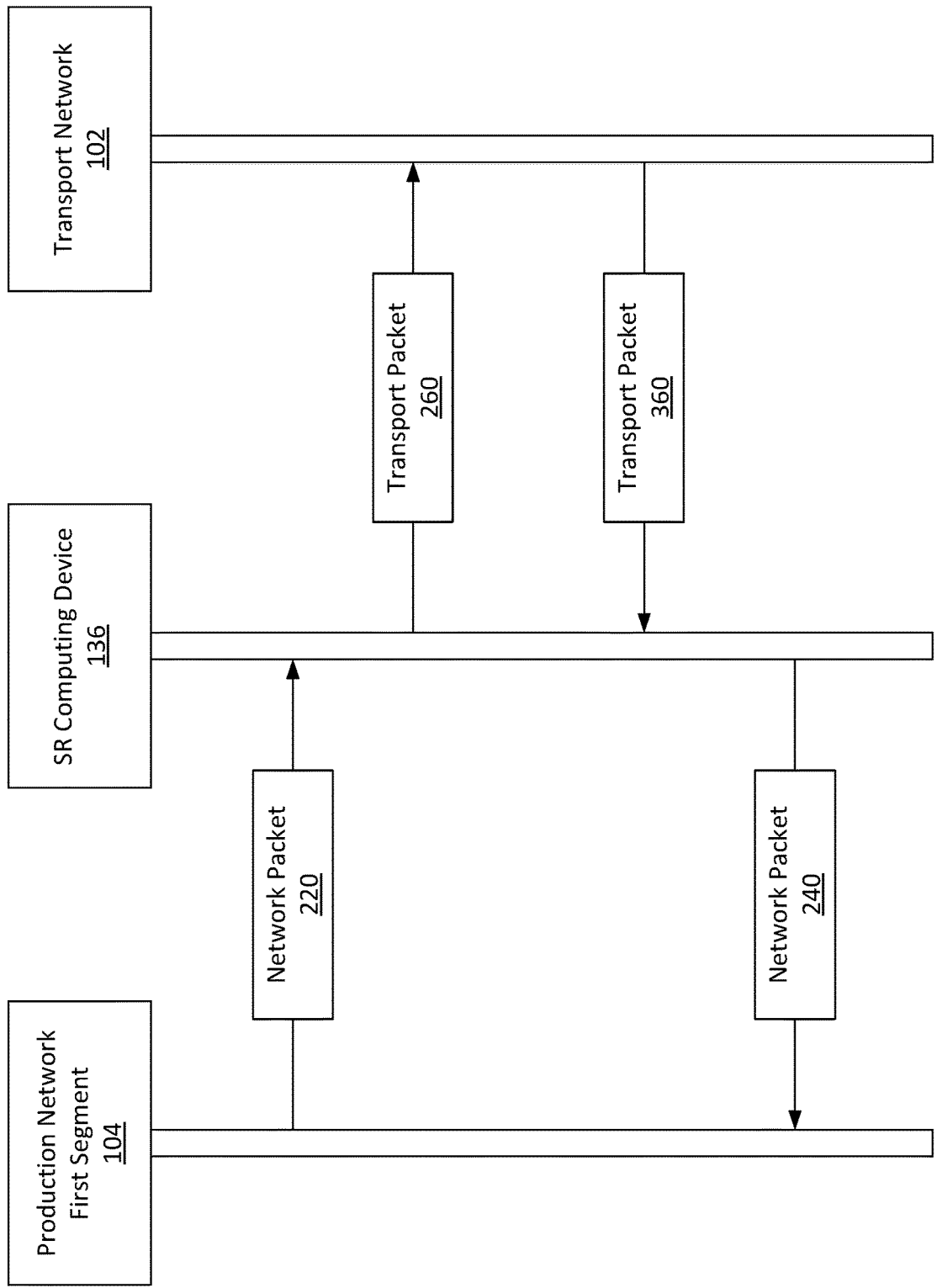

FIG. 3 depicts a network level message flowchart illustrating an example network system 100, including production network first segment 104, SR computing device 136, and transport network 102 (shown in FIG. 1). SR computing device 136 receives network packet 220 (shown in FIG. 2) from production network first segment 104, and transmits a transport packet 260 (shown in FIG. 2) to transport network 102. In some embodiments, the SR computing device is configured to receive a transport packet 360 from transport network 102, and transmit a network packet 240 to production network first segment 104.

Figure 4:
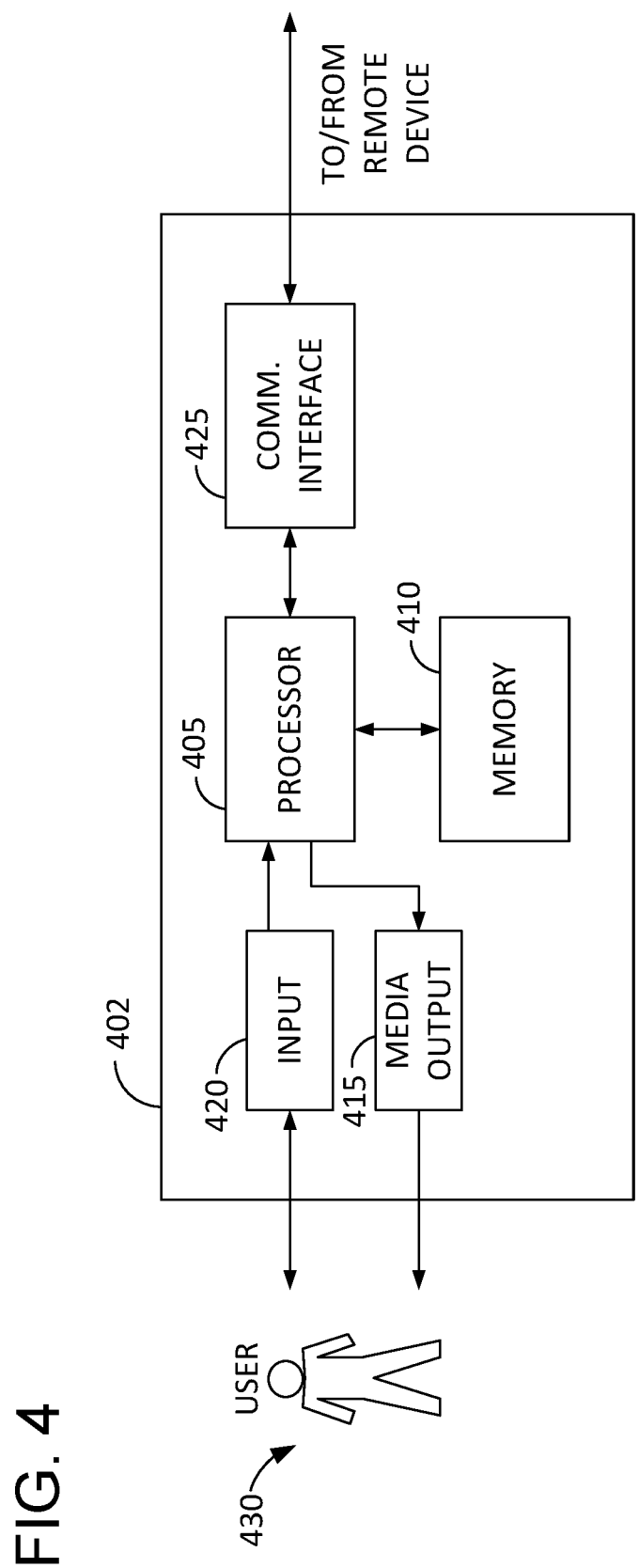

FIG. 4 depicts an exemplary configuration of a remote or user computing device 402, such as network device 124 and network device 128 (shown in FIG. 1). Computing device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or other data to be stored and retrieved. Memory area 410 may include one or more computer-readable media.

Computing device 402 may also include at least one media output component 415 for presenting information to a user 430. Media output component 415 may be any component capable of conveying information to user 430. In some embodiments, media output component 415 may include an output adapter, such as a video adapter and/or an audio adapter. An output adapter may be operatively coupled to processor 405 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 415 may be configured to present an interactive user interface (e.g., a web browser or client application) to user 430.

In some embodiments, computing device 402 may include an input device 420 for receiving input from user 430. Input device 420 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

Computing device 402 may also include a communication interface 425, which may be communicatively coupleable to a remote device. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 430 via media output component 415 and, optionally, receiving and processing input from input device 420. A user interface may include, among other possibilities, a web browser and client application. Web browsers enable users 430 to display and interact with media and other information typically embedded on a web page or a website from a web server associated with a merchant. A client application allows users 430 to interact with a server application associated with, for example, a vendor or business. For example, a client application stored on network device 124 may enable user 430 to interact with SR computing device 136.

Figure 5:
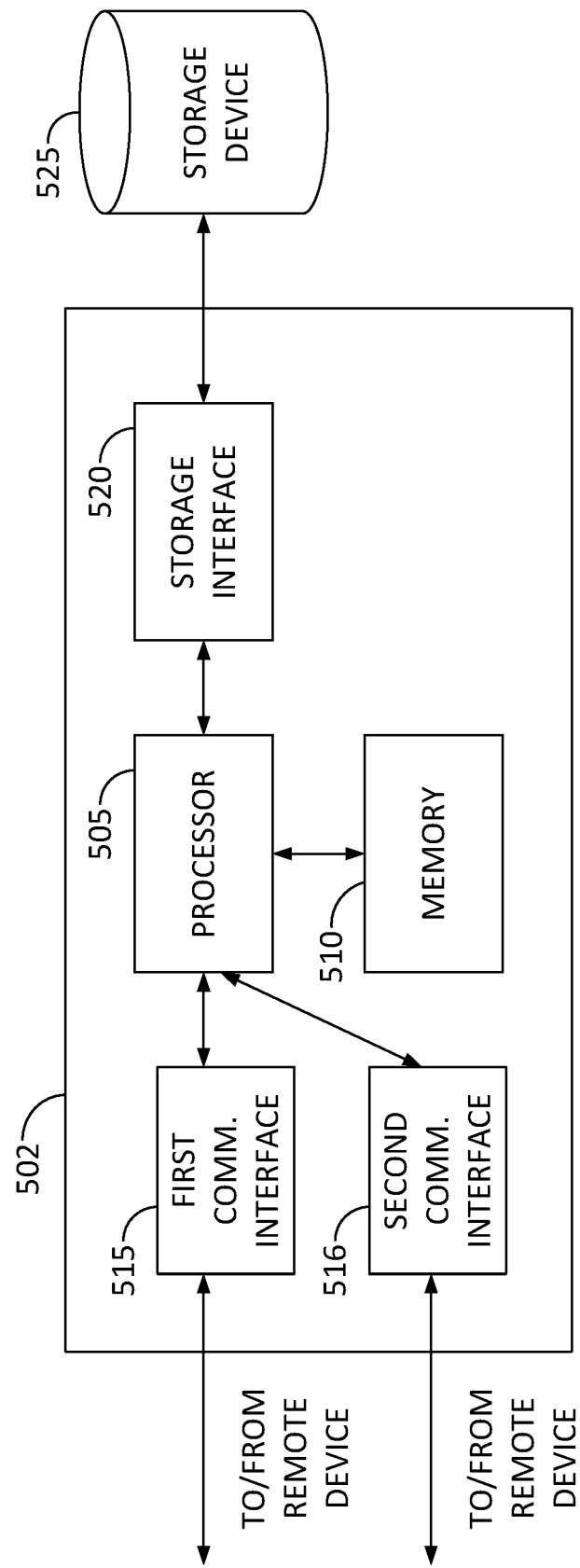

FIG. 5 depicts an exemplary configuration of a host computing device 502, such as SR computing device 136, and SR computing device 138 (shown in FIG. 1). Host computing device 502 may include a processor 505 for executing instructions. Instructions may be stored in a memory area 510, for example. Processor 505 may include one or more processing units (e.g., in a multi-core configuration).

Processor 505 may be operatively coupled to a first communication (i.e., network) interface 515 and a second communication interface 516 such that host computing device 502 may be capable of communicating with a remote device such as computing device 402 shown in FIG. 4 or another host computing device 502. In some embodiments, communication interface 515 and/or communication interface 516 may be a virtual interface. In certain embodiments, communication interface 515 and/or communication interface 516 are associated with a network address, such as an IP address. In other embodiments, communication interface 515 and/or communication interface 516 are associated with physical network links. For example, communication interface 515 may receive network packets from a user computing device 402 via Ethernet, using a switching device.

Processor 505 may also be operatively coupled to a storage device 525. Storage device 525 may be any computer-operated hardware suitable for storing and/or retrieving data. In some embodiments, storage device 525 may be integrated in host computing device 502. For example, host computing device 502 may include one or more hard disk drives as storage device 525. In other embodiments, storage device 525 may be external to host computing device 502 and may be accessed by a plurality of host computing devices 502. For example, storage device 525 may include multiple storage units such as hard disks or solid state disks in a redundant array of inexpensive disks (RAID) configuration. Storage device 525 may include a storage area network (SAN) and/or a network attached storage (NAS) system.

In some embodiments, processor 505 may be operatively coupled to storage device 525 via a storage interface 520. Storage interface 520 may be any component capable of providing processor 505 with access to storage device 525. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 525.

Memory areas 410 (shown in FIG. 4) and 510 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
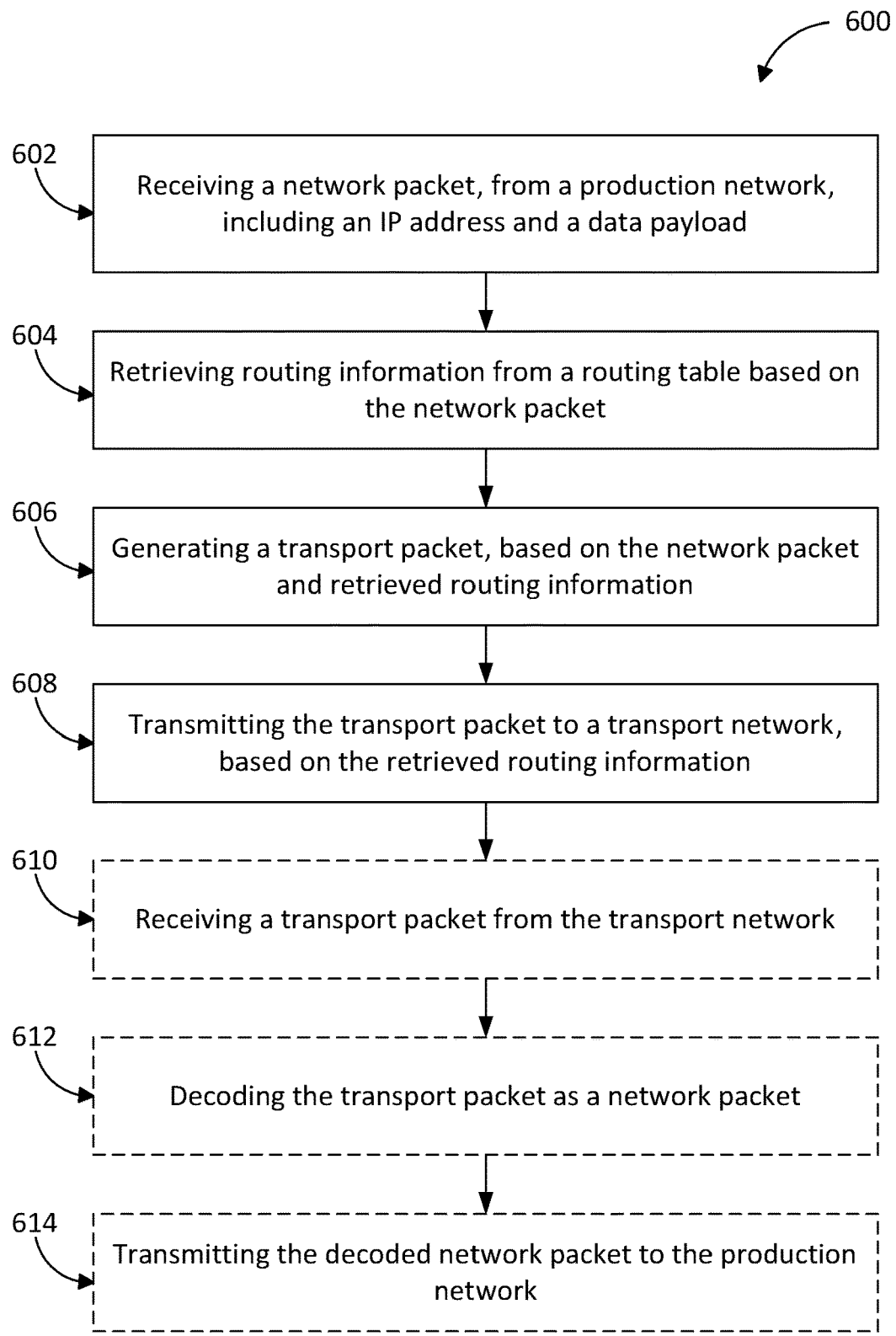

FIG. 6 is a flow diagram of an example method 600 for providing a tunnel connection between network segments using a SR computing device, such as network system 100 (shown in FIG. 1). In the example embodiment, method 600 is performed by a SR computing device. In certain embodiments, method 600 may be at least partially performed by a different computing device. In other embodiments, method 600 may include additional, fewer, or alternate actions, including those described elsewhere herein.

Method 600 begins with the SR computing device receiving 602 a network packet, from a production network, including an IP address and a data payload. The SR computing device retrieves 604 routing information from a routing table based on the network packet, and generates 606 a transport packet, based on the network packet and retrieved routing information. In some embodiments, the routing information includes instructions to route a transport packet over a satellite link. The SR computing device further transmits 608 the transport packet to a transport network, based on the retrieved routing information.

In some embodiments, the SR computing device is further configured to receive 610 a transport packet from the transport network, decide 612 the transport packet as a network packet, and transmit 614 the decoded network packet to the production network.

Figure 7:
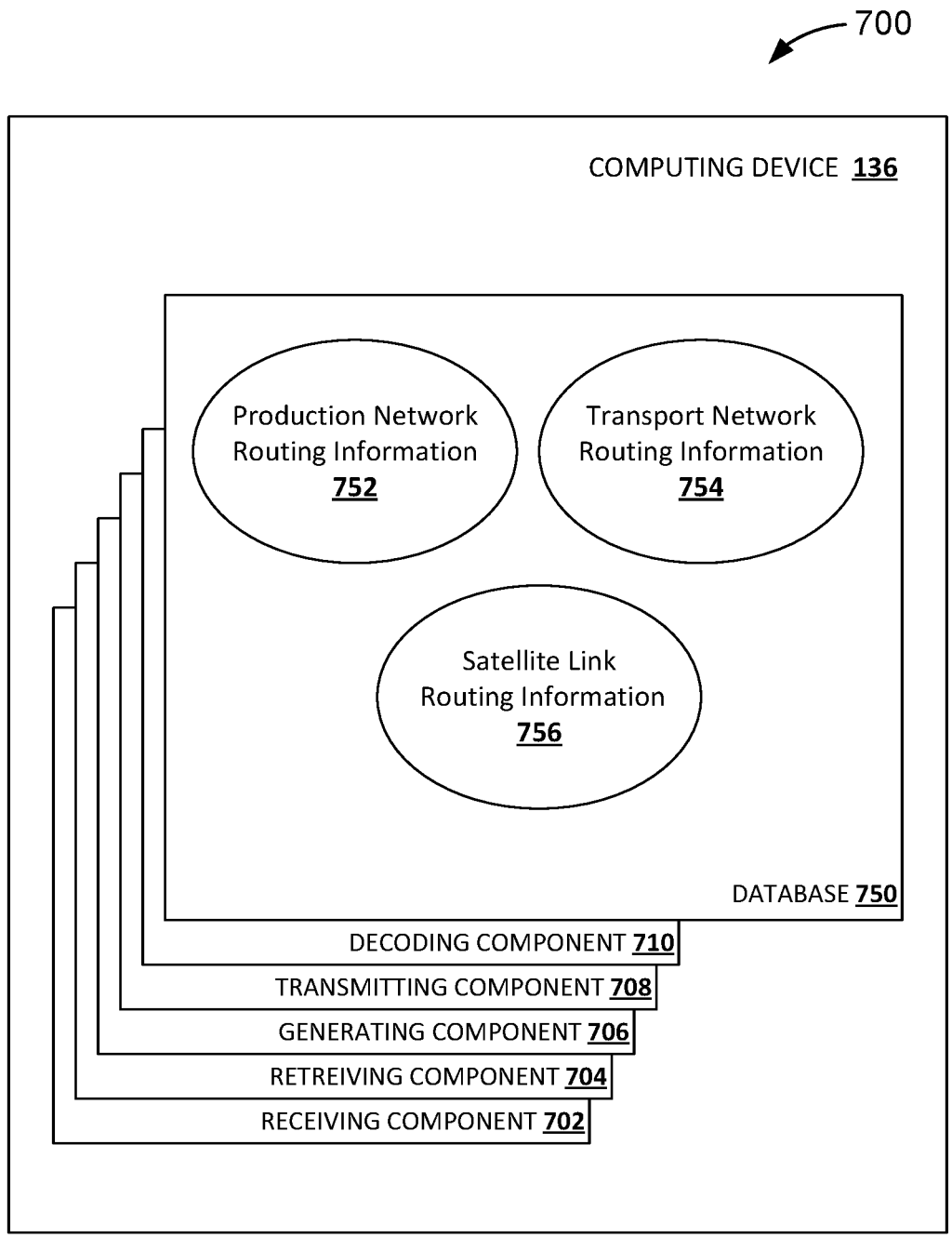

FIG. 7 is a diagram 700 of components of one or more example computing devices that may be used in the method shown in FIG. 6. FIG. 7 further shows a configuration of a database system, including SR computing device 136. Database system 750 is coupled to several separate components within the SR computing device 136 (shown in FIG. 1), which perform specific tasks.

SR computing device 136 includes a receiving component 702 configured to receive network packets and/or transport packets, and a retrieving component 704 configured to retrieve routing information. SR computing device further includes a generating component 706 configured to generate transport packets, and a transmitting component 708 configured to transmit network packets and/or transport packets. In some embodiments, SR computing device includes a decoding component 710 configured to decode transport packets as network packets.

In an exemplary embodiment database system 750 is divided into a plurality of sections, including but not limited to, a production network routing information section 752, a transport network routing information section 754, and a satellite link routing information section 756. In some embodiments, these sections may be separated between SR computing device computing devices, including SR computing device 136 and SR computing device 138.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A satellite routing (SR) computing device comprising:
a first network interface communicatively coupled to a second segment of a production network, wherein the production network is routed based on border gateway protocol;
a second network interface communicatively coupled to a transport network, wherein the transport network is routed based on multiprotocol label switching (MPLS); and
a processor and a memory in communication with the processor, wherein the processor is programmed to:
receive a transport packet from the transport network over the second network interface, the transport packet including transport network routing information and a transport packet payload, the transport packet payload including a destination IP address and a data payload, the data payload originating at a first segment of the production network;
generate, by removing an MPLS label from the received transport packet, a network data packet based on the destination IP address and the data payload recovered from the transport packet payload; and
transmit the network data packet over the first network interface to the second segment of the production network, based at least in part on the destination IP address.

2. The satellite routing (SR) computing device of claim 1, wherein the second network interface is a virtual network interface.

3. The satellite routing (SR) computing device of claim 1, wherein the transport packet includes the data payload in a compressed format, and the processor is programmed to generate the network data packet by uncompressing the data payload.

4. The satellite routing (SR) computing device of claim 1, wherein the transport network routing information includes instructions for the transport packet to be routed over at least one satellite link.

5. The satellite routing (SR) computing device of claim 1, wherein the transport packet includes an encrypted version of the data payload, and the processor is programmed to generate the network data packet by decrypting the encrypted version of the data payload.

6. The satellite routing (SR) computing device of claim 5, wherein the processor is programmed to decrypt the data payload using an encryption key associated with the production network.

7. A computer-implemented method for satellite data routing, the method implemented by first and second satellite routing (SR) computing devices, the method comprising:
receiving, by the first SR computing device, a first network data packet including a destination IP address and a data payload over a first network interface of the first SR computing device from a first segment of a production network, wherein the destination IP address is associated with a second segment of the production network, and wherein the production network is routed based on border gateway protocol;
retrieving, by the first SR computing device, transport network routing information, based at least in part on the destination IP address, from a routing table stored within a memory of the first SR computing device, wherein the routing table includes destination address rules and transport network routing information for a transport network;
generating, by the first SR computing device, a transport packet including the transport network routing information and a transport packet payload, wherein the transport network routing information includes instructions for the transport packet to be routed over at least one satellite link and the transport packet payload includes the destination IP address and the data payload;
transmitting, by the first SR computing device, the transport packet to the transport network over a second network interface of the first SR computing device, based at least in part on the transport network routing information;
receiving, by the second SR computing device, the transport packet from the transport network over a second network interface of the second SR computing device;
generating, by the second SR computing device by removing an MPLS label from the received transport packet, a second network data packet based on the destination IP address and the data payload recovered from the transport packet payload; and
transmitting, by the second SR computing device, the second network data packet over a first network interface of the second SR computing device to the second segment of the production network, based at least in part on the destination IP address.

8. The computer-implemented method of claim 7, wherein the second network interface of the first and second SR computing devices is a virtual network interface.

9. The computer-implemented method of claim 7, wherein generating the transport packet comprises including, by the first SR computing device, a compressed version of the data payload in the transport packet, and wherein generating the second network data packet comprises uncompressing, by the second SR computing device, the compressed version of the data payload.

10. The computer-implemented method of claim 9, further comprising creating, by the first SR computing device, the compressed version of the data payload using at least one HTTP compression protocol.

11. The computer-implemented method of claim 7, wherein generating the transport packet comprises including, by the first SR computing device, an encrypted version of the data payload, and wherein generating the second network data packet comprises decrypting, by the second SR computing device, the encrypted version of the data payload.

12. The computer-implemented method of claim 11, further comprising creating the encrypted version of the data payload using an encryption key associated with the production network.

13. At least one non-transitory computer-readable storage media for satellite data routing, the at least one computer-readable storage media having computer-executable instructions embodied thereon, wherein, when executed by at least one processor of a satellite routing (SR) computing device, the computer-executable instructions cause the at least one processor to:
receive a transport packet from a transport network over a second network interface of the SR computing device, the transport packet including transport network routing information and a transport packet payload, the transport packet payload including a destination IP address and a data payload, the data payload originating at a first segment of a production network;
generate, by removing an MPLS label from the received transport packet, a network data packet based on the destination IP address and the data payload recovered from the transport packet payload; and transmit the network data packet over a first network interface of the SR computing device to a second segment of the production network, based at least in part on the destination IP address.

14. The at least one non-transitory computer-readable storage media of claim 13, wherein the computer-executable instructions further cause the at least one processor to receive the transport packet from the second network interface implemented as a virtual network interface.

15. The at least one non-transitory computer-readable storage media of claim 13, wherein the transport packet includes the data payload in a compressed format, and the computer-executable instructions further cause the at least one processor to generate the network data packet by uncompressing the data payload.

16. The at least one non-transitory computer-readable storage media of claim 13, wherein the transport network routing information includes instructions for the transport packet to be routed over at least one satellite link.

17. The at least one non-transitory computer-readable storage media of claim 13, wherein the transport packet includes an encrypted version of the data payload, and the computer-executable instructions further cause the at least one processor to generate the network data packet by decrypting the encrypted version of the data payload.

18. The at least one non-transitory computer-readable storage media of claim 17, wherein the computer-executable instructions further cause the at least one processor to decrypt the data payload using an encryption key associated with the production network.

* * * * *